April 12, 1960 J. A. DEUBEL 2,932,456
TEMPERATURE CONTROL SYSTEM AND COMPENSATED
THERMOSTAT THEREFOR
Filed June 13, 1957
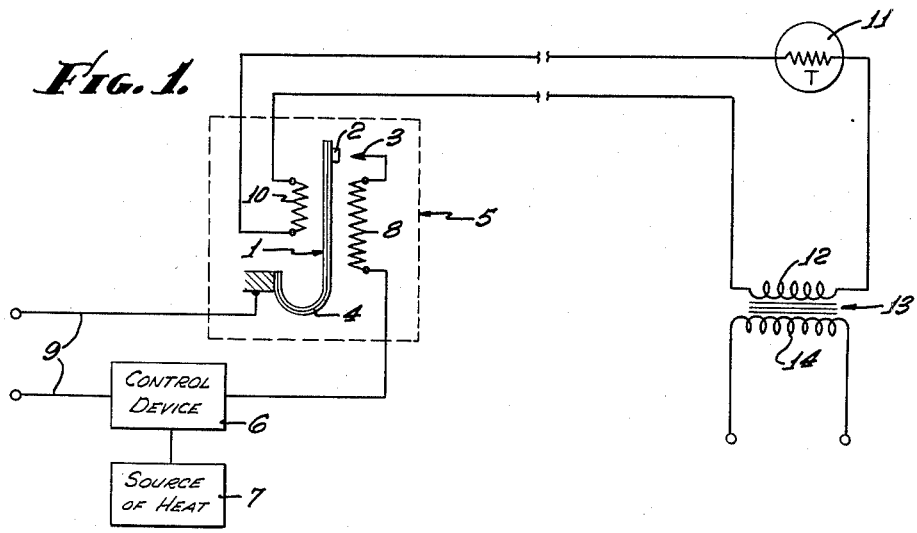
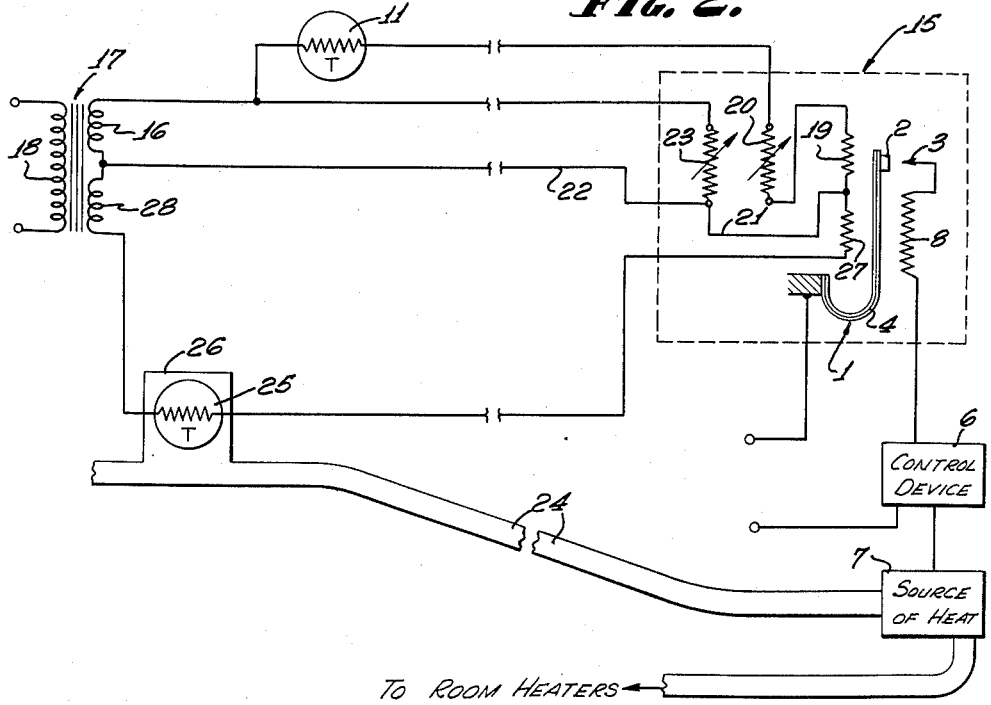
INVENTOR.
JUSTIN A. DEUBEL
BY
*Flam and Flam*
ATTORNEYS.

United States Patent Office 2,932,456
Patented Apr. 12, 1960

2,932,456

TEMPERATURE CONTROL SYSTEM AND COMPENSATED THERMOSTAT THEREFOR

Justin A. Deubel, Milwaukee, Wis., assignor to General Controls Co., Glendale, Calif., a corporation of California Application June 13, 1957, Serial No. 665,449

5 Claims. (Cl. 236—68)

This invention relates to temperature control systems and to thermostats useful therein. More particularly, the invention is concerned with the heating of an enclosure, such as a residence, auditorium, or the like.

It is the primary purpose of such heating systems to maintain a comfortable temperature. It is common to provide heating systems controlled by a thermostat, so that the heating means is rendered active whenever the temperature at the thermostat reaches a definite low value; the thermostat continues to demand heat until a definite high temperature is attained at the thermostat. In present day systems, the differential between this low and high temperature may be about one degree Fahrenheit.

In such a basic system, the thermostat responds only to the enclosure temperature. It has been found that to provide comfortable heating, other factors must be considered. For example, one such factor is the rate at which heat is lost to the external atmosphere. It has been found therefore that additional heating is required as the temperature differential between the interior and the exterior increases.

It has been common to provide a heat anticipator for the thermostat. Such an anticipator is in the form of an electric heater, transferring heat to the thermostat, and energized while the thermostat demands more heat. Such an anticipator causes the thermostat to return to a position in which no heat is demanded, before it otherwise would. In other words, it serves to anticipate a rise in temperature that would take place even after the heater system is shut down.

It has been found that where the heat anticipator is active for long periods, due to fast heat transfer from the space being heated, or other causes, more heat is transferred by the heat anticipator into the thermostat case or enclosure, and therefore the thermostat begins to control at a lower temperature than the desired set point. The deviation between the controlling point and the desired control point or set point is often termed "droop" or "offset."

It is therefore an object of this invention to compensate or correct for this undesired droop or offset.

Another factor that contributes to thermostat offset or droop is the rate at which heat is transferred from the heating medium to the occupant or occupants. Under such circumstances, when the differential is low, the load on the heating system is reduced, even though it is still cold outside. If the circulating heating medium is a fluid, such as heated water, then the water returning to be reheated is warmer than otherwise, because the heating system does not have to work at full capacity.

Substantially the same effects are noted upon an increase or decrease in occupancy. Upon an increase in occupancy, the load on the system is similarly reduced.

It is therefore another object of this invention to make it possible to reduce the temperature differential between closing and opening of the thermostat whenever the return water is relatively warm.

Furthermore, it is advantageous to make it possible to adjust or set the system to provide the optimum effects. For example, when the temperature exterior to the enclosure is much lower than in the enclosure, the delay in deenergizing the heating control should be longer than when the exterior temperature more nearly approaches the enclosure temperature.

It is another object actually to change the control point of the thermostat to match the radiation condition. In other words, the body feels more or less comfortable depending upon which temperature it "sees" in losing heat by radiation. If the body is radiating to cold walls, the ambient air must be at a higher temperature for the body to be comfortable than if it is radiating to warm walls. Thus in a system where the temperature of the walls is a function of the outdoor temperature as the outside temperature goes down, the ambient air temperature should be raised. On the other hand, if the heating system is a panel type system where the walls are heated and the temperature of the walls increases as the outdoor temperature decreases, then the control point of the thermostat should drop as the outside temperature decreases.

It is another object of this invention to provide a heat control system and a thermostat for producing these effects in a simple and effective manner.

It is another object of this invention to provide compensation for such heat anticipators to correct them in accordance with variations of other factors, such as external temperatures or the temperature of the heating medium after it has transferred heat to the enclosure.

It is another object of this invention to utilize a modifier of the temperature affecting the thermostat by heat, so as to comply with the desired control functions hereinbefore outlined. For example, a thermostat heater can be used, the degree of energization of which is dependent upon external conditions. As the external temperature is reduced, the heater generates less heat, whereby the thermostat is in active heat-demanding position for a longer period.

As before stated, when the differential between the external temperature and the enclosure temperature is quite high, the thermostat is purposely caused to delay deenergizing the heating system. By the aid of this invention, the system can be set so that when the temperature in the enclosure is increased by reducing the heat anticipator effect, then this increase has a definite ratio to the differential between the exterior and interior temperatures. For example, for each ten degrees of differential, the temperature within the enclosure may be caused to be increased by one degree. This invention, by the aid of range change resistors located in the thermostat housing, makes it possible to change this ratio as desired.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a schematic wiring diagram of one form of the invention; and

Fig. 2 is a scematic wiring diagram of a modified form of the invention.

In Fig. 1, a thermostat 1 is arranged to open or close a circuit controller including contact members 2 and 3. The contact member 2 is shown as mounted upon a bimetal member 4. This member 4 is arranged to move to the right upon a decrease in temperature, and to move toward the left upon an increase in temperature, respectively to close and open the contact members 2 and 3.

The contact member 2 is appropriately carried by the bimetal member 4 adjacent the free end of the bimetal member. The contact member 3 is normally stationary.

The thermostat device is located in a housing 5 which is placed in an enclosure, the temperature of which is to be controlled. This enclosure may be a room, auditorium, theater, or the like.

Upon a sufficient decrease in temperature, the circuit controller 2—3 operated by the bimetal member 4 serves to energize a control device 6 which is placed in series with the contact members 2 and 3. This control device serves to operate a fuel valve, a relay, or the like which places a source of heat 7 into operation.

It is common to provide in connection with thermostats of this character a heat anticipator heater 8 which is also in series with the contact members 2 and 3. Accordingly, the heater 8, which is enclosed in the housing 5, serves to heat the bimetal member 4 just as soon as the contact members 2 and 3 are closed. This causes the thermostat to deenergize the control circuit before the temperature of the enclosure or room reaches the temperature at which the thermostat is set. Such heat anticipating systems being now well-known, further description thereof is considered unnecessary.

The control device 6 and the heat anticipator 8 may be supplied from mains 9 leading to a source of electrical energy. This source may be arranged to supply an electromotive force of twenty-four volts, which is standard for control circuits of this character.

Let us assume that the temperature prevalent exterior of the enclosure wherein the thermostat 1 is located, is substantially below the temperature within the enclosure. Under such circumstances, it has been found to add to the comfort of the occupants to delay the opening of the thermostat contact members 2 and 3 so as to continue the heating beyond that which would occur under normal circumstances. Thus, an additional heating means, such as the heater 10, located within the housing 5 is caused to affect the temperature of the thermostat 1. This heating means may be such that when the exterior temperature is low, the heating current through the heating means 10 is reduced. On the other hand, as the external temperature rises, the heating current through the additional heating means 10 is increased and the thermostat 1 opens the control circuit earlier than otherwise. The combined maximum effect of heating means 8 and 10 is carefully chosen to cause the contact members 2 and 3 to open when there exists the desired maximum differential between the temperature at the thermostat 1 and in the enclosure or space being heated. As the external temperature drops, the heating effect of the heater 10 is reduced so as to retard opening of the contact members 2 and 3 and thereby to retard the shutting off of the source of heat 7.

To effect this result, use is made of a thermistor 11 located in series with the heating means 10 and energized by the aid of a secondary winding 12 of a step-down transformer 13. The primary winding 14 may be connected to any appropriate source of electrical energy.

The thermistor 11 is so arranged that its resistance varies substantially with the temperature to which it is exposed. Accordingly, it is placed exterior of the enclosure. As the temperature is reduced, the resistance of the thermistor 11 increases, thereby reducing the heating effect of the heating means 10. As the exterior temperature increases, the thermistor resistance decreases, with the attendant increase in the heat produced by the heating means 10.

In the form shown in Fig. 2, the thermostat structure 1 and its associated control heaters are enclosed in the housing 15. This thermostat 1 causes a source of heat 7 to become active and inactive in accordance with the position of the bimetal member 4.

In the present instance, the thermistor 11 exposed to the exterior temperature is arranged to be supplied with electrical energy by the aid of a secondary winding 16 of a transformer 17 having a primary winding 18. The secondary winding 16 may have a relatively low electromotive force, such as for example four volts. The circuit for the thermistor 11 includes, in addition to the electrical heating means 19, an additional resistor 20. The complete circuit for the thermistor 11 therefore includes the secondary winding 16, thermistor 11, heat resistor 20, heating means 19 and connections 21 and 22 to the winding 16.

The resistor 20 being placed within the housing 15, of course, adds to the heating effect of the heat anticipating means 8. It is preferably adjustable.

Another resistor 23 which may also be adjustable is located within the housing 15 and is directly connected across the terminals of the secondary winding 16.

In a system of this character, it is desirable that the temperature differential between the exterior and the enclosure or room have a definite ratio to the temperature difference between that attained at the thermostat and that attained in the space being heated. For example, it may be desirable to cause a differential of one degree at the thermostat for each twenty degrees of the difference between the internal and external temperatures; or this ratio may desirably be fifteen to one, or ten to one, etc. By proper choice of resistors 20 and 23, this ratio may be definitely determined. Obviously, the shunting resistor 23 affects the terminal voltage across the control circuit for thermistor 11, and this alters the overall heating effect of that circuit.

There is also indicated in Fig. 2, a conduit 24 which carries a heating medium, such as water, heated by the source 7 and transferring its heat to the enclosure. Thus, the medium at lower temperature is acted upon by the source 7 and is passed out of source 7 at a higher temperature.

When the rate of heat transferred to the space is reduced, the heating load is correspondingly lowered. The temperature of the water in the return conduit therefore increases.

In the present instance, means are provided to reduce the heating as the requirement for heat is reduced. For this purpose, a thermistor 25 is provided which is in heat transfer relation to the heating medium as indicated by the housing 26. The warmer this heating medium is, the less the resistance of the thermistor. This thermistor is placed in series with an additional electrical heating means 27 affecting the temperature of the bimetal 4. The source of energy for this heating circuit is another secondary winding 28 of the transformer 17 having an electromotive force, for example, of two volts.

Should the temperature of the heating medium be high at the thermistor 25, this is an indication that the heating load is light. Accordingly, the thermostat 1 should be made to open before the desired temperature in the enclosure is reached. This is accomplished by the thermistor 25. The warmer the thermistor, the less the resistance and accordingly the greater the heat produced by the heating means 27, causing the thermostat to tend to be off for longer periods of time or controlled at a slightly lower set point.

On the other hand, if the heating medium is too low in temperature, then the energization of the heating means 27 should be reduced, so that the heat source 7 be kept active for a longer period. This is accomplished by the thermistor 25. Upon a reduction of the temperature in thermistor 25, its resistance increases and accordingly the heating effect of the heating means 27 is reduced.

The inventor claims:

1. In a system for controlling a heating means for an enclosure, said system including a thermostat, said thermostat assuming a position in which the heating means is rendered active upon a sufficient decrease in temperature at the thermostat, and another position in which the heating means is rendered inactive, upon a sufficient increase in temperature at the thermostat, said heating means including a circulating liquid medium, and a closed conduit for the medium, to which heat is transferred by the heating means, and from which heat is transferred to the enclosure, said liquid medium having a return conduit: the combination therewith of means for altering the temperature of the thermostat, supplementary to the temperature of the enclosure, and corresponding to the temperature of the medium in the return conduit.

2. In a system for controlling a heating means for an enclosure, said system including a thermostat, said thermostat assuming a position in which the heating means is rendered active upon a sufficient decrease in temperature at the thermostat, and another position in which the heating means is rendered inactive, upon a sufficient increase in temperature at the thermostat, said heating means including a circulating liquid medium, and a closed conduit for the medium, to which heat is transferred by the heating means, and from which heat is transferred to the enclosure, said liquid medium having a return conduit: the combination therewith of means for altering the temperature of the thermostat, supplementary to the temperature of the enclosure, and corresponding to the temperature of the medium in the return conduit, said temperature altering means including a thermistor subjected to the temperature of the medium in the return conduit.

3. In a system for controlling a heating means for an enclosure, said system including a thermostat, said thermostat assuming a position in which the heating means is rendered active upon a sufficient decrease in temperature at the thermostat, and another position in which the heating means is rendered inactive, upon a sufficient increase in temperature at the thermostat, said heating means including a circulating liquid medium, and a closed conduit for the medium, to which heat is transferred by the heating means, and from which heat is transferred to the enclosure, said liquid medium having a return conduit: the combination therewith of means for altering the temperature of the thermostat, supplementary to the temperature of the enclosure, and corresponding to the temperature of the medium in the return conduit; and additional means for altering the temperature of the thermostat and responsive to external temperature.

4. In a system for controlling a heating means for an enclosure, said system including a thermostat, said thermostat assuming a position corresponding to a set point at which the heating means is rendered active upon a sufficient decrease in temperature at the thermostat, and another position in which the heating means is rendered inactive, upon a sufficient increase in temperature at the thermostat, said thermostat having a housing: the combination therewith of a first and a second heating circuit for the thermostat for providing heat anticipation, and each circuit including a heater in the housing; the first circuit being energized only when the thermostat is in heat-demanding position, and the degree of energization being substantially independent of any temperature changes either internally or externally of the enclosure; the second circuit being continuously energized, and including a resistor in which the resistance increases as its temperature decreases, and subjected to the temperature existing externally of the enclosure, to cause the heating of the thermostat to decrease as the external temperature decreases; the resistance of the heater in the second circuit being adjustable; and a third heating circuit having a heater therein and located in the housing, said third heater being adjustable to determine the amount of heat transmitted by said third heater to the interior of the housing, and its effect being independent of the temperatures internal or external of the enclosure; said heaters in the second and third heating circuits serving to determine the ratio between two quantities, one quantity being the difference between the internal and external temperatures and the other quantity being the departure of the response of the thermostat from its set point.

5. In a system for controlling a heating means for an enclosure, said system including a thermostat, said thermostat assuming a position corresponding to a set point at which the heating means is rendered active upon a sufficient decrease in temperature at the thermostat, and another position in which the heating means is rendered inactive, upon a sufficient increase in temperature at the thermostat, said thermostat having a housing: the combination therewith of a first and a second heating circuit for the thermostat for providing heat anticipation, and each circuit including a heater in the housing; the first circuit being energized only when the thermostat is in heat-demanding position, and the degree of energization being substantially independent of any temperature changes either internally or externally of the enclosure; the second circuit being continuously energized, and including a resistor in which the resistance increases as its temperature decreases, and subjected to the temperature existing externally of the enclosure, to cause the heating of the thermostat to decrease as the external temperature decreases; said second circuit also including an adjustable resistor located in the housing; and a third heating circuit including an adjustable resistor in the housing, said third heating circuit having its heating effect within the housing determined substantially entirely by the adjustment of the resistor included in said third heating circuit.

References Cited in the file of this patent

UNITED STATES PATENTS

| | | |
|---|---|---|
| 1,876,636 | Dicke | Sept. 13, 1932 |
| 1,899,532 | Shurtleff | Feb. 28, 1933 |
| 1,902,105 | Selby | Mar. 21, 1933 |
| 1,970,988 | Taylor | Aug. 21, 1934 |
| 2,092,327 | Persons | Sept. 7, 1937 |
| 2,181,427 | Grant | Nov. 28, 1939 |
| 2,236,624 | Littwin | Apr. 1, 1941 |
| 2,282,180 | Gille | May 5, 1942 |
| 2,339,635 | Hall | Jan. 18, 1944 |
| 2,602,591 | Wilson et al. | July 8, 1952 |
| 2,732,132 | Hulett | Jan. 24, 1956 |